US006350335B1

(12) United States Patent
Hampel et al.

(10) Patent No.: US 6,350,335 B1
(45) Date of Patent: Feb. 26, 2002

(54) MICROSTRIP PHASE SHIFTERS

(75) Inventors: Karl Georg Hampel, New York, NY (US); Henry Miles O'Bryan, Plainfield, NJ (US); John Thomson, Spring Lake, NJ (US); Roderick Kent Watts, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/694,388

(22) Filed: Oct. 23, 2000

Related U.S. Application Data

(62) Division of application No. 09/250,899, filed on Feb. 16, 1999, now abandoned.

(51) Int. Cl.[7] .......................... B32B 31/26; H01P 11/00

(52) U.S. Cl. ............................... 156/89.14; 156/89.16; 427/58; 427/123; 427/126.3; 333/1.1; 333/24.1

(58) Field of Search .......................... 156/89.12, 89.14, 156/89.16; 427/58, 123, 126.3; 333/1.1, 24.1

(56) References Cited

U.S. PATENT DOCUMENTS

| | | | | |
|---|---|---|---|---|
| 4,578,656 A | | 3/1986 | Lacour et al. | |
| 4,835,500 A | * | 5/1989 | Sequeira | |
| 5,561,407 A | * | 10/1996 | Koscica et al. | |
| 5,694,134 A | * | 12/1997 | Barnes | |
| 5,721,194 A | * | 2/1998 | Yandrofski et al. | |
| 5,772,820 A | * | 6/1998 | Schoch, Jr. et al. | 333/1.1 X |
| 5,774,025 A | * | 6/1998 | Adam et al. | 333/24.1 |
| 5,828,271 A | * | 10/1998 | Stitzer | 333/24.1 |
| 5,830,591 A | * | 11/1998 | Sengupta et al. | |
| 5,876,539 A | * | 3/1999 | Bailey et al. | 156/89.16 |
| 5,897,812 A | * | 4/1999 | Kitai et al. | |
| 6,078,827 A | * | 6/2000 | Jackson | |

* cited by examiner

*Primary Examiner*—Curtis Mayes
(74) *Attorney, Agent, or Firm*—Peter V. D. Wilde; Thomas, Kayden, Horstemeyer & Risley LLP

(57) ABSTRACT

The specification describes a phase shifting microstrip device in which the ground plane electrode is formed on a substrate surface and a film of ferroelectric material with a thickness less than 200 μm is formed over the ground plane electrode. The microstrip electrode is formed over the film of ferroelectric material to produce a microstrip device with an operating voltage of less than 200 volts.

7 Claims, 2 Drawing Sheets

MICROSTRIP PHASE SHIFTERS

This application is a divisional of U.S. application Ser. No. 09/250,899, filed Feb. 16, 1999, now abandoned.

FIELD OF THE INVENTION

This invention relates to improved microwave phase shifters using microstrips fabricated by thin film techniques.

BACKGROUND OF THE INVENTION

Phased antenna arrays offer flexibility to shape and alter radiation patterns electronically, and achieve such effects as rapid steering of one or more beams, steering nulls, and beam shaping to reduce side lobe effects. Originally developed for radar, phase shifters are becoming of increasing interest for wireless applications, where the requirements are very different.

Recent efforts to improve phase shifters for radar applications have been directed at developing voltage-dependent dielectric devices to replace ferrite phase shifters. See for example, A. T. Findikoglu, Q. X. Jia, and D. W. Reagor, "Superconductor/Nonlinear Dielectric Bilayers for Tunable and Adaptive Microwave Devices", IEEE Trans. Appl. Superconductivity, 7, 2925 (1997); L. C. Sungupta, E. Ngo, J. Synowczynski, and S. Sungupta, "Optical and Electrical Studies of Novel Ferroelectric Composites for Use in Phased Array Antennas", Proc. Tenth IEEE Intl. Symp. on Applications of Ferroelectrics (1996), p. 845; F. A. Miranda, R. R. Romanofsky, F. W. Van Keuls, C. H. Mueller, R. E. Treece, and T. A. Rivkin, "Thin Film Multilayer Conductor/Ferroelectric Tunable Microwave Components for Communications Applications", Integrated Ferroelectrics, 17, 231 (1997).

In a fundamental sense these devices operate as follows. In the paraelectric phase of some dielectrics (above the Curie temperature for a ferroelectric material) there is a large change in the dielectric constant under the application of a sizable electric field (a few volts per micron). If the dielectric is incorporated into a delay line, the electric field can produce a change in phase of a wave propagating along the line.

These phase shifting devices typically have one of two physical configurations. The simplest form is a microstrip configuration where a metal stripline is formed over a ferroelectric body, and the ferroelectric body is sandwiched between the stripline and a ground plane electrode. The microstrip typically has a width of 50 $\mu$m to 1 mm, and sufficient length to obtain the desired electrical coupling. The other configuration is a coplanar waveguide where both electrodes are located on the same surface and the microwave propagates along a stripline between the electrodes (see Findikoglu, supra). The coplanar configuration offers the advantage of a lower operating voltage because the drive electrodes can be formed close to the microwave strip line using planar processing techniques.

To illustrate the theory of operation of these devices consider first the delay line equation:

$$v=c/\sqrt{\epsilon_{eff}}$$

where v is the phase velocity and $\epsilon_{eff}$ is the effective dielectric constant for propagation on the line. $\epsilon_{eff}$ depends in a complicated way on the variable dielectric constant $\epsilon$ of the dielectric. Using the phase shift equation:

$$\Phi=\omega l/v$$

where l is the length of the delay line and ω is the phase circular frequency. we obtain:

$$\Delta\Phi=(\omega l/2c/\sqrt{\epsilon_{eff}})\Delta\epsilon_{eff}$$

The dielectric constant can be written as a function of applied voltage V or applied field E:

$$\Delta\epsilon(V)/\epsilon(0)=a_1V+a_2V^2+\ldots$$

$$\Delta\epsilon(E)/\epsilon(0)=b_1E+b_2E^2+\ldots$$

The terms of second order give rise to third order intermodulation distortion. The first order terms produce second harmonics which can be filtered out. (Higher order terms in the above equation are usually negligible.) Because of the greater non-uniformity of the electric field for coplanar configured devices as compared with microstrip configured devices, intermodulation distortion can be expected to be greater for coplanar waveguide devices. Accordingly, the microstrip configuration is a better choice. However, the drawback to this device choice is that, due to the thickness of the ferroelectric layer in the sandwich configuration, the voltages required to alter the phase of the propagating wave is very large, i.e. ~500–1000V. Thus there a particular need for improvement of phase shifting devices using a microstrip configuration.

STATEMENT OF THE INVENTION

We have developed a new microstrip device using thin film technology where the ground plane electrode is placed on the upper surface of the support substrate, and the ferroelectric layer is formed on the ground plane electrode as a thin film. The stripline is formed on the thin ferroelectric layer. In this configuration the separation between electrodes can be reduced significantly, e.g. by a factor of ten, and the drive voltage can be reduced correspondingly.

DETAILED DESCRIPTION

Figure 1:
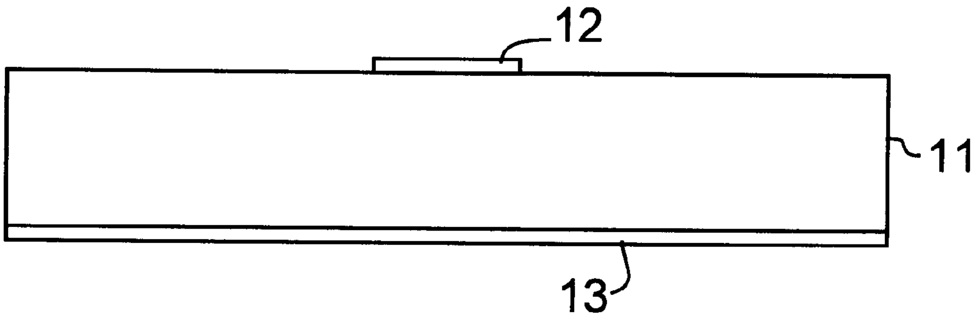
FIG. 1 (prior art)
FIGS. 1 and 2 are schematic representations of conventional microstrip phase shifting devices.

Conventional microstrip phase shifting devices are made with either a bulk or thin film configuration. A typical bulk microstrip phase shifting device is shown in FIG. 1. The device support or substrate 11 is a thick slab of ferroelectric material, e.g. barium strontium titanate (BST). The microstrip electrode is shown at 12 and the ground plane electrode at 13. The voltage required to operate this device is dependent on the thickness of the BST slab. Approximately 1V/$\mu$m is typical. In these devices the substrate may be of the order of 0.5–1.0 mils in thickness and the operating voltage therefore is of the order of 500–1000 volts.

Figure 2:
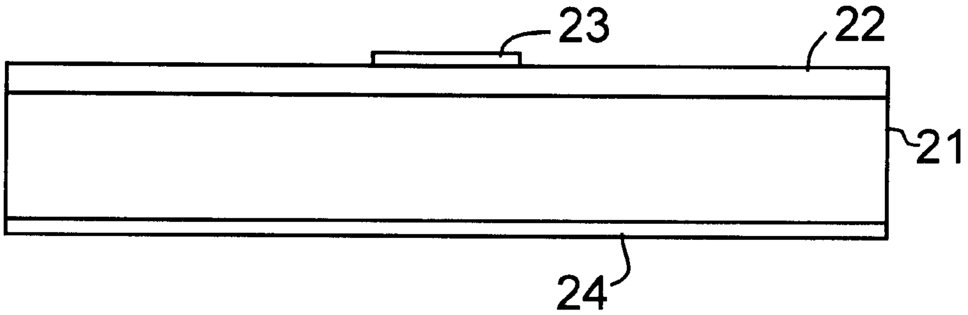
FIG. 2 (prior art)

A thin film version of the microstrip phase shifting device is shown in FIG. 2. Here the main device support is an inert ceramic substrate 21 and the BST layer 22 is deposited as a thin film on the support substrate. The electrodes 23 and 24 are similar in structure as in the device of FIG. 1. This microstrip phase shifting device structure offers the advantages of using less BST material, which reduces cost of the device, and allows for better dimensional control of the waveguide thickness. However, high operating voltages are still required.

Figure 3:
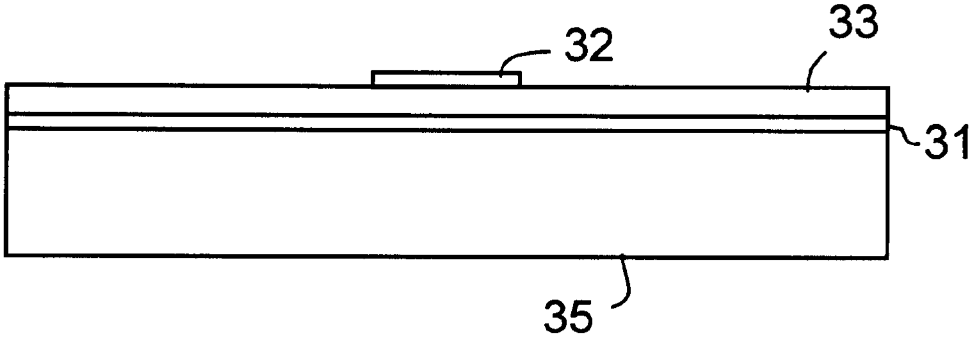
FIG. 3 is a similar representation showing the improved microstrip phase shifting device according to the invention.

In the device of the invention, shown in FIG. 3, the ground plane electrode 31 is buried just beneath the surface of the device. The ground plane electrode 31 and the microstrip electrode 32 are now relatively closely spaced. The BST layer 33 is a thin film formed on the ground plane electrode 31. The substrate 35 performs only a physical support function and can be any of a variety of suitable materials. This device structure gives the same advantage as the device of FIG. 2, i.e. it allows the dimensions of the active waveguide layer to be thin and precisely controlled, but due to the reduced thickness of material separating the electrodes, the required operating voltage is reduced to levels comparable to those for coplanar microstrip phase shifting devices.

The preferred fabrication approach to making microstrip phase shifting devices of the invention uses multilayer ceramic technology. This technology is well developed and widely used to fabricate arrays of electronic devices of both simple and complex shapes of precise geometry. See for example, A. J. Moulson and J. M. Herbert, Electroceramics, Chapman Hall, N.Y., 1990, p. 223 and B. Schwartz, "Ceramic Packaging of Integrated Circuits", Electronic Ceramics, ed. L. Levinson Dekker, New York, 1998, see Chapter 1. In general, the technology is based on the use of flexible ceramic tape. The tape may be patterned to form features such as vias, cavities, etc. The tape, of controlled thickness, is comprised of a uniform mixture of ceramic powder, organic binder, and plasticizer. The latter two ingredients impart flexibility and durability to the tape. Individual tape layers can be patterned by creating holes or other features in the tape. Circuits can be printed on the layers using screen printing techniques. Two or more, e.g. 2–50, of these tapes are then layered together to form a multilayer ceramic preform with the desired interconnection structure. If the holes in the multiple layers are properly aligned, vias and other internal structures are formed. The preform is then cured by pressure, typically 300–700 psi, and elevated temperature, i.e. >50° C., to drive off the binder and fuse the multiple layers together thus forming a strong monolithic multilayer structure. Many devices on a single substrate can be formed in a batch process using this process sequence, and individual devices singulated by scoring and breaking the substrate. The multilayer structures are then consolidated by cosintering to full density at a temperature dictated by the ceramic composition and metallurgy used.

Specifically, as the technology applies to the fabrication of microstrip phase shifters of the invention, this approach realizes the following advantages. The multilayer process, in a general sense, is a well documented, mature technology. Tape manufacture, as well as the multilayer processes of patterning, assembly and lamination, scoring, sintering and singulation, can be automated. Economy of scale results from this processing approach as it is particularly adapted to produce devices in an array format similar to that used in semiconductor IC wafer manufacture. For example, an array size of 5"×5", and a microstrip phase shifting device size of 0.4×0.4, yields approximately 81 devices from a single batch. If subsequent plating is required, the array design can be engineered to provide a plating bus connection to each device by a printed pattern formed in one of the internal layers of the multilayer structure. With vias, the electrical path can then be routed to surface metal pads for power and ground connections during the electroplating process. After plating, electrical isolation is achieved in the singulation process.

The preferred material for the microstrip phase shifting device of the invention is barium strontium titanate. However, a variety of other materials can be chosen, e.g. potassium dihydrogen phosphate.

Barium strontium titanate with nominal composition $Ba_xSr_yTiO_3$ has been studied extensively as a phase shifter material. A $Ba_{0.5}Sr_{0.5}TiO_3$ composition, with small additions (≦1 mole %) of MgO and $MnO_2$, has a tan δ (loss) of <1%, a dielectric constant ε of about 8500, and a tunability of ~26% (i.e. when a biasing voltage of 5000 v/cm is applied, a significant change in the capacitance, i.e. the dielectric constant, occurs). A high dielectric constant can be a significant disadvantage for phase shifter applications. At wireless frequencies of interest the characteristic impedance of the microstrip should be greater than about 15 ohms. Thus a reasonable objective for materials suitable for microstrip phase shifting devices for wireless applications is ε<100, tan δ<1%, and tunability>1%.

We have demonstrated that conventional processing of $Ba_{0.6}Sr_{0.4}TiO_3$ yields material with an ε of 2600, tan δ=1.5%, and a tunability of 19%. Conventional processing includes wet aqueous mixing of carbonate and oxide sources of Ba, Sr, and Ti.(~16 hours), drying and screening of the mixed reagents through a 100-mesh sieve, an 1150° C., 6 hour pre-reaction (calcine) to form the compound of interest, and additional wet, aqueous ball milling (6 hours) to yield an average powder particle size of 1–2 μm. A final drying and screening of the powder through a 100-mesh sieve prepares the powder for forming into a useful shape for subsequent sintering (1350° C.).

A suitable fabrication sequence for the microstrip phase shifting device of the invention follows.

The tape as described above is prepared from a mixture of ceramic powder dispersed in an organic binder, e.g. 15 wt % butyl vinyl acetate (Butvar B-76). The ceramic powder may be the magnesium modified BST described earlier, or may be $BaTiO_3$, $SrTiO_3$ and $MgTiO_3$ precursors of that modified BST. Added to the ceramic powder mixture are 2 wt % Santicizer 160 plasticizer, 1 wt % Menhaden fish oil dispersant, and 50 wt % of a 50/50 by volume toluene-ethyl alcohol solution. After blending for 16 hours, the slurry is poured into the reservoir of a "doctor blade"/casting head and formed into a tape of controlled thickness by casting on a silicone coated Mylar film supported by a flat glass plate. The doctor blade/casting head allows the thickness of the wet slurry to be precisely controlled as the head is hydraulically driven over the casting surface. During drying, evaporation of the organic solvents is rate controlled to prevent cracking of the tape. The treated Mylar prevents the cast material from sticking to the casting surface. After drying, the butyl vinyl acetate and plasticizer impart flexibility and durability to the tape during subsequent processing.

Three 7" wide×8' long tapes of Mg modified BST were prepared. Experiments with sintering conditions showed that tape shrinkage is ~15% in the z-direction (thickness) and ~12.5% in the x-y plane. Accordingly, a shrinkage factor is included in the "green" dimensions to yield the correct finished tape size. For robustness, the microstrip phase shifting device was designed with a minimum of three layers, each with a final (fired) thickness of approximately 0.030". The tapes were cut into 5"×5" blanks. The effective working area of the blanks was 4.25"x4.25". A 9x9 array of devices 0.4"x0.4" can be produced from each 5" blank.

Figure 4:
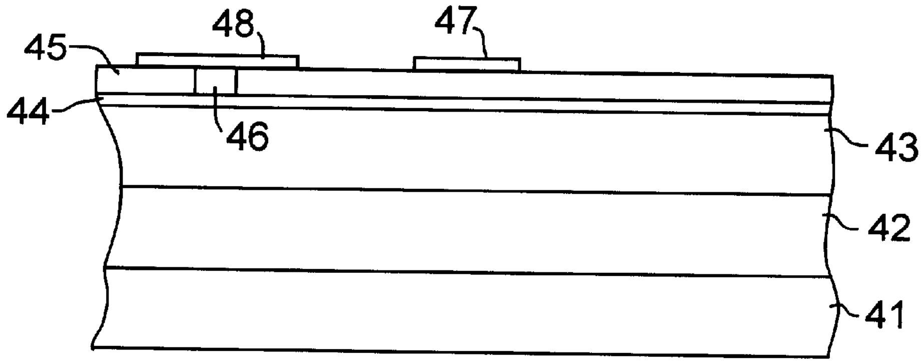
FIG. 4 is a more detailed view of a laminated ceramic structure showing one specific embodiment of the invention.

A detailed cross section of one of the array of microstrip phase shifting devices is shown in FIG. 4. In this embodiment the entire device structure is formed using the laminated ceramic process described above. The substrate for the device comprises ceramic layers 41, 42 and 43. The composition of the layers 41–43 may be BST for reasons of process integration and thermomechanical stability, but may be any ceramic material, or any other suitable substrate material, laminated or solid. The multilayer structure shown and described here offers the advantage of allowing multilayer interconnections (not shown) in the laminate, and also the incorporation of passive devices such as resistors and capacitors in the structure. The ground plane electrode 44 is deposited on the last of the multilayers of the substrate as shown in FIG. 4. The ground plane electrode can be any suitable conductor such as 50/50 Pd—Ag. In the preferred fabrication sequence, the metal layer 44 for the ground plane is deposited on layer 43 prior to laminating the multiple layers together. The ground plane layer can be a solid sheet of conductor, or can be a hatched pattern to save material and reduce capacitance. The next layer 45 is the active BST layer, and can be made as thin as desired since it performs no structural support function. In the embodiment described here the active layer has a thickness in the range 50–200 $\mu$m, which, if using the materials described above, gives an operating voltage of the order of 50–240 volts. To reduce the operating voltage even further, the active layer 45 can be screen printed, which can produce a layer thickness in the range of 5–20 microns, with an operating voltage of less than 24 volts. Screen printing is cost effective and convenient. Moreover, patterned layers are easily formed using this approach.

Figure 5:
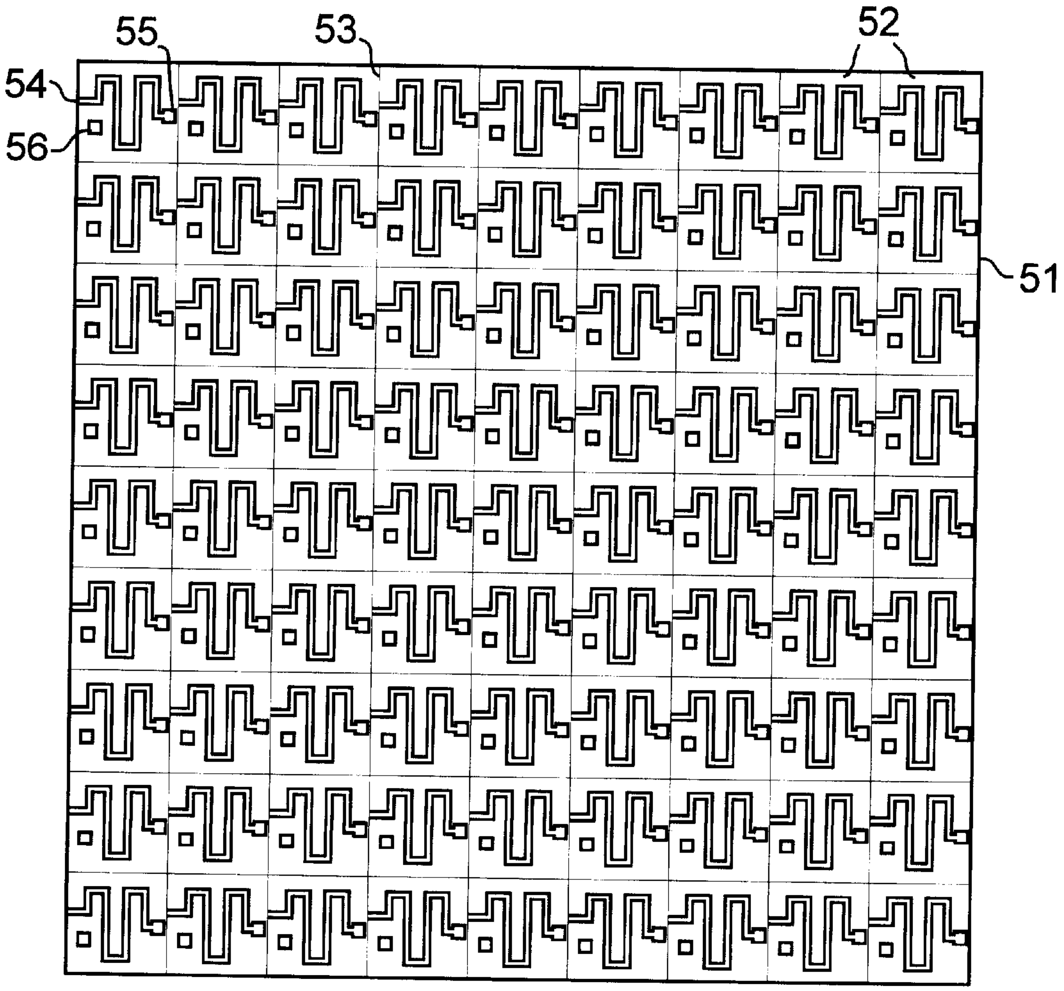
FIG. 5 is a schematic representation of a 9×9 monolithic array of microstrip phase shifting devices formed on a single ceramic body.

The active layer in FIG. 4 includes a via 46 for contacting the ground plane electrode. The via is formed as described earlier by punching an opening in the partially cured ceramic tape. Vias may have any suitable dimensions, e.g., 0.01" diameter. The via is filled with conductor ink or paste prior to lamination. Next the microstrip line 47 is formed on the surface of the active BST layer. This layer can be formed using either known additive processing such as screen printing, or known subtractive processing such as lithography. The shape of the strip line is typically a meander path, as shown in FIG. 5, to increase electrical coupling per unit of device area. Since the strip line 47 in this embodiment is the topmost layer, it can be formed either before or after the laminate is assembled and fired. The bonding pads for the strip line (not shown) and the bonding pad 48 for the ground plane electrode are preferably formed in the same operation used for forming the strip line.

If the active layer is screen printed, according to the option described above, vias can easily be formed using the appropriate screen pattern. In this case it is preferred to fire the screen printed active layer, and the via filling material, prior to applying the microstrip electrode.

A typical 9x9 array of microstrip phase shifting devices is shown in FIG. 5. The ceramic laminated blank is designated 51 with the individual device sites 52 and the scribe lines for singulation shown at 53. Each device site has a meander strip line 54, a strip line bonding pad 55, and a ground plane bonding pad 56.

The devices described in connection with FIGS. 4 and 5 are essentially planar structures that can be surface mounted to a printed wiring board and the bonding pads interconnected by conventional wire bonding. Alternatively, the devices can be flip-chip mounted using solder interconnections to the pads 55 and 56. The surface of the device can be protected with a photodefinable polymer to cover the electrode pattern while leaving open the bonding pads for flip-chip bonding. Another option is to route the ground plane via in the other direction, to the bottom of the structure of FIG. 4, and provide a via for the microstrip to the same bottom surface.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for the manufacture of a ferroelectric device comprising the steps of:

(a) preparing a substrate, (b) depositing a first metal conductor layer on the substrate, (c) screen printing an active ferroelectric layer on the first metal conductor layer, the active ferroelectric layer having a thickness in the range 5–20 microns, and having a plurality of holes through the active ferroelectric layer exposing the first metal conductor layor, and (d) selectively depositing a second metal conductor layer on the active ferroelectric layer, said second metal conductor layer having a first portion contacting the first metal conductor layer through the said holes, and a second portion on the surface of the active ferroelectric layer.

2. The method of claim 1 wherein the active ferroelectric layer comprises $Ba_xSr_yTiO_3$.

3. The method of claim 2 where said ferroelectric layer further includes $MgTiO_3$.

4. The method of claim 2 wherein the substrate comprises $Ba_xSr_yTiO_3$.

5. The method of claim 1 wherein the substrate and the ferroelectric layer are of the same material.

6. The device of claim 1 where the substrate is a laminated structure.

7. Method for the manufacture of a ferroelectric device comprising the steps of:

(a) preparing a $Ba_xSr_yTiO_3$ ceramic substrate by steps comprising:

(i) forming multilayer interconnections on the surface of a first $Ba_xSr_yTiO_3$ ceramic tape, (ii) applying a second $Ba_xSr_yTiO_3$ ceramic tape over the surface of the first ceramic tape, (iii) forming a first metal conductor layer on the second $Ba_xSr_yTiO_3$ ceramic tape, (iv) co-firing the $Ba_xSr_yTiO_3$ ceramic tapes to form the substrate, (b) screen printing a $Ba_xSr_yTiO_3$ active ferroelectric layer on the substrate, the $Ba_xSr_yTiO_3$ active ferroelectric layer having a thickness in the range 5–20 microns, and having a plurality of holes through the $Ba_xSr_yTiO_3$ active ferroelectric layer exposing the first metal conductor layer, (c) filling the holes with conductor, (d) firing the $Ba_xSr_yTiO_3$ active ferroelectric layer and conductor, and (e) selectively depositing a second metal conductor layer on the $Ba_xSr_yTiO_3$ active ferroelectric layer.

* * * * *